Oct. 22, 1963

H. L. GREENWALD 3,107,726

RECOVERY OF OIL FROM TAR SANDS AND
OTHER OIL-BEARING FORMATIONS

Filed Feb. 3, 1961

Process Applied to Oil Recovery Via Wells

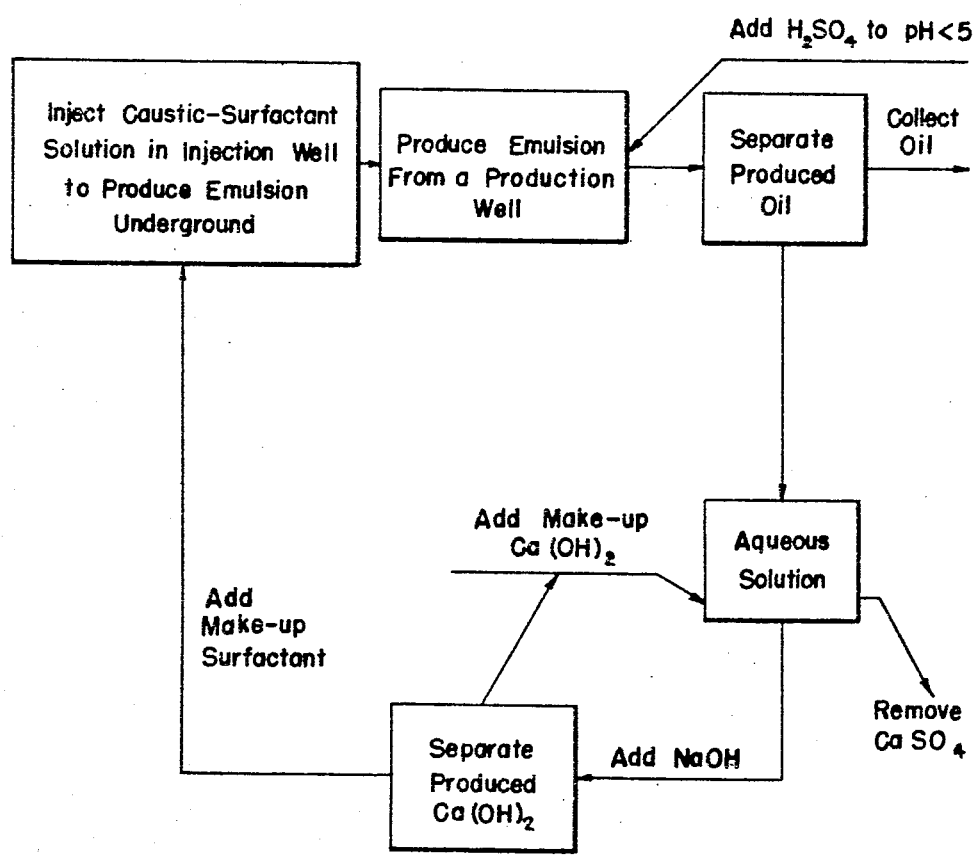

Note:
If an acid-base system is used such that the salt formed is water-soluble, the steps corresponding to discarding $CaSO_4$ and adding NaOH may be eliminated. Examples of other alkaline materials which may be used are NaOH, KOH, $NH_4OH$, $Ca_2CO_3$, numerous amines. Also, in lieu of $H_2SO_4$, any other acid, inorganic or organic, or even acid salts may be used.

United States Patent Office 3,107,726
Patented Oct. 22, 1963

3,107,726
RECOVERY OF OIL FROM TAR SANDS AND OTHER OIL-BEARING FORMATIONS
Harold L. Greenwald, Levittown, Pa., assignor to Rohm & Haas Company, Philadelphia, Pa., a corporation of Delaware
Filed Feb. 3, 1961, Ser. No. 87,041
2 Claims. (Cl. 166—8)

This is a continuation-in-part of application Serial Number 760,935, filed on September 15, 1958.

This invention relates to a novel method for separating and recovering oil from tar sands and other oil-bearing formations. It particularly pertains to methods for recovering oil employing a well-flooding operation using an aqueous surfactant solution, and is especially significant because it also provides for the reclamation and re-use of the surfactant.

Broadly stated, the object of my invention is to provide an efficient method for effecting the recovery of oil by a type of water-flooding operation in which an aqueous surfactant solution is employed to accomplish the oil recovery, and for recovering and re-using most of the surfactant so used.

Another object is to provide a process for the recovery of oil by the use of an aqueous surfactant solution which causes an oil-water emulsion to be produced, said emulsion being readily and inexpensively broken so that the surfactant can be efficiently recovered in a single phase and re-used and the oils economically obtained.

Other objects of the invention, together with some of the advantageous features thereof, will appear from the following description and specification. In most cases, recovery of the surfactant will be a principal feature; however, the invention is not necessarily limited thereto as in certain applications it will be useful only to emulsify and demulsify in accordance with the novel methods herein described.

Many agents have been proposed for emulsifying and demulsifying oils. But in certain applications, notably in the recovery of oil from various unusual petroleum-bearing formations, such as tar sands, these agents have proven unsatisfactory for one reason or another. Among the principal objections are the use of relatively costly emulsifying materials which are substantially non-recoverable, the difficulty in forming the emulsions, the difficulty in breaking the emulsions, etc.

The present invention overcomes all of these objections by the novel use of certain surfactants in emulsification-demulsification procedures which make possible high recovery of all components by controllably changing the hydrophilic-lipophile balances of a surfactant during the process. (The term "surfactant" and "emulsifier" or "emulsifying agent" as hereinafter employed may be used interchangeably.) The controlled change of this balance is brought about by the use of pH-sensitive emulsifiers: The oil is either emulsified under alkaline conditions and the emulsion later broken by adding acid to make the solution acidic; or emulsified under acid conditions and broken by adding alkali to make the solution alkaline. In actual practice, it may be desirable in some cases to effect a closer control of the acidity or alkalinity of the treated solution in order to maximize the recovery of surfactant. This variation of pH effectively controls emulsion stability and the concentration of the surface-active agent in each phase.

In my process, when stability of the emulsion is rendered a minimum, recovery of the surfactant for reuse is facilitated either by preferential solubility of the surfactant in the organic or the aqueous phase or by precipitation of the surfactant. My invention may thus be practiced in three alternative procedures which may conveniently be grouped as follows:

CATEGORY A
(1) Make oil-water emulsion by means of a surfactant
(2) Recover surfactant in aqueous phase by suitable control of pH in both steps

CATEGORY B
(1) Make oil-water emulsion by means of a surfactant
(2) Recover surfactant in organic phase by suitable control of pH in both steps

CATEGORY C
(1) Make oil-water emulsion by means of a surfactant
(2) Recover surfactant as a precipitate by suitable control of pH in both steps As indicated earlier, and as will be explained in more detail below, the emulsions formed in each of the above categories may optionally be made in a base and broken with an acid, or vice versa.

Ordinarily, in emulsions, appreciable fractions of the total emulsifier are found in three locations: (1) the bulk oil phase; (2) the bulk aqueous phase; and (3) in the region of the interface. In my invention, I not only destroy the emulsion, but also I effect a concentration of the surfactant in one bulk phase or the other as I choose. This choice is made dependent on the contemplated mode of reuse of the surfactant or of the surfactant as a separate, pure—or almost pure—phase for convenience in reuse. This ability to concentrate, in one phase, a good emulsifier which otherwise is spread over three locations as above explained, is a novel as well as highly useful feature of my invention.

*Examples of Process Employing Single Cycle*

Not all surfactants will work in my novel process and, of those that do work, not all of them will function satisfactorily in each of the three categories described above. The selection and manner of employment of the various surfactants are, therefore, important to the successful practice of the invention. In essence, it may be stated that any surfactant having weakly acidic or weakly basic groups will work in one or more of the systems encompassed by my invention. The surfactants which will not work efficiently are those whose hydrophilic portion is entirely (a) non-ionic, or (b) composed of the anion of a strong acid or of the cation of a strong base.

In the numerous examples which were conducted to demonstrate the operation of the invention, the starting solutions employed were divided into two main sets. One set was a 0.5 percent solution of the surfactant in 0.5 percent NaOH, and the other set was a 0.5 percent solution of the surfactant in 0.5 percent $H_2SO_4$. However, in order to demonstrate effectiveness at different concentrations, several experiments were run in which the initial surfactant concentration ranged from 0.05 to 20 percent.

Equal volumes of the oil and of the surfactant-caustic or of the surfactant-acid solution (as the case may be) were placed in each of the two screw-cap jars and agitated on a reciprocating type shaker for 15 minutes. The emulsified contents of one jar were poured into a graduated cylinder and allowed to stand for one hour, at which time the volumes of the various phases were recorded and the percent recovery of the aqueous phase (a measure of emulsion instability) computed. To the contents of the other jar either acid or base was added until the pH was rendered below about 5 in the ones which were made acidic and above around 9 in the ones which were made alkaline. After complete breaking of the emulsion, or after one hour, whichever was earlier, the volumes of the organic and aqueous phases, respectively were recorded. Suitable surfactants for the particular oil-water system gave low instability in the first jar and high instability in the second jar. The emulsion instability one hour after adding the acid or base was computed and reported as the percent recovery of the aqueous phase.

For any surfactant having weakly acidic or weakly basic groups, oil-water systems will be found in which my invention will operate efficiently. Conversely, for any given oil-water system, surfactants of this type exist which will work efficiently. It is well-known in the art that the hydrophilic-lipophile balance of an emulsifier determines its effectiveness for a given oil-water system. Thus, the well-known techniques for choosing a good emulsifier are to be applied to the classes containing weakly acidic or weakly basic groups as a preliminary step in the practice of my invention. This was done as described in the following paragraphs.

All the tests were conducted at room temperature. The pH was checked at two or more points in each case. The surfactants which formed a relatively stable emulsion in base were deemed to be useful in the processes of all three categories, A, B, and C, previously described, particularly the processes in which the oil was emulsified in base and broken with acid. High, low, or moderate recovery of the surfactant in aqueous phase determined whether the surfactant belonged in category A or B or failed to qualify. If a high percentage of the surfactant precipitated upon acidification, the surfactant qualified for category C. The same principles were used in determining the utility of surfactants for the processes in each of the three categories in which the oil was emulsified in acid and broken with base, except that the direction along the pH scale was reversed.

The above-described tests involve a single cycle process, and the data obtained thereby are represented in Tables 1, 2, 3 and 4. Other experiments were run with a recycling process, which will be described in detail below, and the data obtained thereby are represented in Tables 5, 6 and 7. In almost all of the examples, the oils used were toluene and "Ventura" crude oil (a relatively "clean" crude oil). Six other oils (i.e. organic liquids which are insoluble in water) were used to test the efficiency of the invention under various conditions making a total of eight as follows:

(1) Toluene
(2) Ventura crude oil
(3) Howard Glasscock crude oil
(4) Hawkins Field crude oil
(5) Wesson oil (cottonseed oil)
(6) Di-butyl sebacate
(7) Di-octyl sebacate
(8) Mixture of lauryl and myristyl alcohols.

NOTE.—Nos. 2, 3 and 4 represent oils that are well-known by those names to persons familiar with the petroleum field. No. 5 is a well-known commercial product sold under that name. No. 8 is a commercially available mixture sold under a tradename.

The results obtained with the single cycle process are set forth in Tables 1 to 4.

TABLE 1.—EMULSIFIED IN CAUSTIC, BROKEN WITH ACID; SURFACTANT RECOVERED IN AQUEOUS PHASE

[Organic phase: Toluene. Aqueous phase: Surfactant, 0.5% NaOH, deionized $H_2O$ (all pH's: 12.8–13.1)]

| Surfactant | Mole ratio of $EO(n)$ [a] | Surfactant conc. in weight/ volume percent (I. C.) [b] | Emulsion instability in caustic | pH [c] after acidification | Emulsion instability after acidification | A—percent of I. C. of surfactant in aqueous | B—percent of I. C. of surfactant in toluene | A+B [d] |
|---|---|---|---|---|---|---|---|---|
| 1 | 10.0 | 0.5 | 36 | 3–4 | 102 | 98 | 3 | 101 |
| 2 | 12.6 | 0.5 | 35 | | 102 | | | |
| 3 | 15.0 | 0.05 | 98 | 3.6 | 100 | ([e]) | 7 | ([e]) |
| 4 | 15.0 | 0.5 | 22 | 2–3 | 100 | 100 | <1 | 100 |
| 5 | 15.0 | 5.0 | 18 | 4 | 101 | 89 | 0 | 89 |
| 6 | 20.0 | 0.5 | 32 | 2.1 | 101 | 98 | 1 | 99 |
| 7 | 20.0 | 20.0 | 0 | 1.5 | 103 | 101 | 1 | 102 |
| 8 | 30.0 | 0.5 | 30 | 2–5 | 103 | 101 | 3 | 104 |
| 9 | 3 | 0.5 | 61 | 4 | 101 | 78 | 42 | 120 |
| 10 | 15 | 0.5 | 61 | 3.0 | 101 | 96 | 2 | 98 |
| 11 | 20 | 0.5 | 14 | 2.8 | 71+ | 94 | 2 | 96 |

NOTES ON TABLE 1

(1) Surfactants Nos. 1 to 8 were ethylene oxide adducts of a commercial product comprising a mixture of amines which principally covers the range of $C_{11}H_{23}NH_2$ to $C_{15}H_{31}NH_2$, the number of ethylene oxide units per amine being from 10 to 30.

(2) Surfactants Nos. 9 and 10 were each the sodium salt of the sulfated ethylene oxide adducts of the type referred to in note (1) above.

(3) Surfactant No. 11 was a commercially available product, a dehydroabietylamine ethylene oxide adduct with the structure

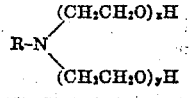

in which $x+y=20$.

[a] "$n$"=number of units of ethylene oxide, including the ethanol termination, in the polyether chain.
[b] "I.C."=initial concentration of surfactant expressed as weight/volume percent.
[c] A single result such as 3 or 3.0 denotes that all of the data were taken for this one pair of emulsions. Where a range is indicated, such as 2–4, one of them (the 2 or the 4) was a repeat. The figures not reported to a tenth of a pH unit were determined by using pH test papers; the other figures were obtained with a pH meter.
[d] $A+B$ should equal 100 percent for complete accountability of the surfactant.
[e] Result obtained was greater than 100 percent due to limitations of method of analysis caused by the low concentration of the surfactant.

Whereas Table 1 contains data comparing various surfactants used in an emulsification-demulsification system in which only toluene was employed, Table 2 which follows compared surfactants in the process as applied to various other oils.

TABLE 2.—EMULSIFIED IN CAUSTIC, BROKEN WITH ACID; SURFACTANT RECOVERED IN AQUEOUS PHASE

[Organic phase: Various oils listed. Aqueous phase: Surfactant, 0.5% NaOH, deionized $H_2O$]

| Surfactant | Mole ratio of EO(n)a | Surfactant conc. in weight/volume percent (I.C.)b | Oil used | Emulsion instability in caustic | pHc after acidification | Emulsion instability after acidification | Percent of I.C. of surfactant in aqueous |
|---|---|---|---|---|---|---|---|
| 1 | 12.6 | 0.5 | Ventura crude oil | 56 | 6.6 | 90 | |
| 2 | 15.0 | 0.05 | do | 4 | 3–4 | 96 | (c) |
| 3 | 15.0 | 0.5 | do | 44 | 3.4 | 98 | 99 |
| 4 | 15.0 | 5.0 | do | 8 | 3.0 | 100 | 93 |
| 5 | 20.0 | 0.5 | do | 40 | 4.0–4.5 | 101 | (d) |
| 6 | 20.0 | 20.0 | do | 0 | 1.4 | 95 | 99 |
| 7 | 30.0 | 0.5 | do | 40 | 2.4–4 | 100 | (d) |
| 8 | 15 | 0.5 | do | 22 | 4.0 | 75 | (d) |
| 9 | 15 | 0.5 | do | 54 | 2.6 | 100 | (d) |
| 10 | 25 | 0.5 | do | 62 | 2.5 | 96 | (d) |
| 11 | 15 | 0.5 | do | 44 | 2.9 | 100 | (d) |
| 12 | 50 | 0.5 | do | 60–70 | 2 | 93 | (d) |
| 13 | 20 | 0.5 | do | 46 | 2.6 | 98 | (d) |
| 14 | 15 | 0.5 | Howard Glasscock | 59 | 2–3 | >99 | 96 |
| 15 | 15 | 0.5 | Hawk. Field | 53 | 2–3 | >97 | 89 |
| 16 | 20 | 0.5 | Wesson oil | 79 | 2 | 100 | |
| 17 | 20 | 5.0 | do | 50 | 2 | 94 | 98 |
| 18 | 20 | 0.5 | Mixture of lauryl and myristyl alcohols. | 0 | 2.1 | 0–32 | |

NOTES ON TABLE 2

(1) Surfactants Nos. 1 to 7 and 14 to 17 were the same as described in note (1) in Table 1.
(2) Surfactant No. 8 was the same as described in note (2) in Table 1.
(3) Surfactants Nos. 9 and 10 were ethylene oxide adducts of a mixture of amines which principally covers the range of $C_{17-24}H_{35-49}NH_2$ where the number of ethylene oxide units per amine is 15 and 25, respectively.
(4) Surfactants Nos. 11 and 12 were a coco-amine ethylene oxide adduct, and a stearyl-amine ethylene oxide adduct, respectively. The former's structure is

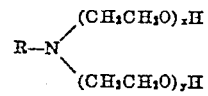

in which $x+y=15$; the latter has the same structure except that $x+y=50$.
(5) Surfactant No. 13 was a commercially available product, a dehydroabietylamine ethylene oxide adduct with the structure

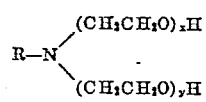

in which $x+y=20$.
(6) Surfactant No. 18 was sodium p-t-octylphenoxypolyethoxy (20 units) acetate with the structure
R—O—$(CH_2CH_2O)_{20}CH_2COONa$.

a Same as footnote a in Table 1.
b Same as footnote b in Table 1.
c Same as footnote c in Table 1.
d The Ventura crude oil contains some impurities which were extracted into the aqueous phase in some instances.
e Same as footnote e in Table 1.

TABLE 3.—EMULSIFIED IN CAUSTIC, BROKEN WITH ACID; SURFACTANT RECOVERED AS PRECIPITATE

[Organic phase: Toluene (except for item marked by asterisk in which Ventura crude oil was used). Aqueous phase: 0.5% surfactant, 0.5% NaOH, deionized water]

| Surfactant | Emulsion instability in caustic | Material added | Emulsion instability after acidification | pH after acidification | Percent of I.C.a in aqueous | Percent of I.C. in toluene | Percent of I.C. which precipitated |
|---|---|---|---|---|---|---|---|
| 1 | 70 | $H_2SO_4$ | 100 | 2.1 | 14 | 14 | 107 |
| 2 | 77 | $H_2SO_4$ | 100 | 2.4 | 29 | 29 | 51 |
| 3 | | $H_2SO_4$ | Ca. 100 | 4.0 | 12 | | 94 |
| 4* | 22 | $H_2SO_4$ | 92 | <4 | (b) | | |

NOTES ON TABLE 3

(1) Surfactant No. 1 was disodium β-tallow iminodipropionate.
(2) Surfactant No. 2 was disodium β-lauryl iminodipropionate.
(3) Surfactants Nos. 3 and 4 were sodium β-coco amino-propionate.

a Same as footnote a in Table 1.
b Same as footnote d in Table 2.

TABLE 4.—EMULSIFIED IN ACID, BROKEN WITH BASE; SURFACTANT RECOVERED IN AQUEOUS OR ORGANIC PHASES

[Organic phase: Toluene (except for items marked by asterisk in which Ventura crude oil was used). Aqueous phase: 0.5% surfactant, 0.5% $H_2SO_4$, deionized water (all pH's: 1–2)]

| Surfactant | Mole ratio of EO(n) | Emulsion instability in acid | Material added | Emulsion instability after adding material | pH after adding Material | Percent of I.C.* in aqueous | Percent of I.C.* in toluene |
|---|---|---|---|---|---|---|---|
| 1 | 5 | 100 | | | | | |
| 2* | 5 | 0 | NaOH | 78 | 11.4 | 23 | |
| 3 | 5 | 100 | NaOH | | 11.4 | 4 | 90 |
| 4* | 5 | 0 | NaOH | 100 | 13.2 | 30 | |
| 5 | 7.5 | 100 | | | | | |
| 6 | 7.5 | 0 | NaOH | 32 | 11.6 | 48 | |
| 7 | 20 | 9 | NaOH | 25 | 10 | | |
| 8 | 20 | 48 | NaOH | 83 | 13.3 | | |
| 9 | 12 | 18 | NaOH | 102 | 12.7 | 108 | 18 |

NOTES ON TABLE 4

(1) The results with surfactants 1 to 6 inclusive show the different effects with different oils. Note that with Ventura crude oil the same surfactant that worked well in Nos. 2 and 4 did not work at all with toluene in Nos. 1 and 3. Similarly, with Ventura crude oil in No. 6, a good result was obtained, but in No. 5 toluene did not work at all.

(2) Surfactants Nos. 1 to 6 were the same as described in note (1) in Table 1.
(3) Surfactants Nos. 7 and 8 were the same as described in note (6) in Table 2.
(4) Surfactant No. 9 was sodium N-polyethoxy (11 units) ethyldodecenylsuccinamate.
* Same as footnote a in Table 1.

In the examples shown in Tables 1 to 4, the number of units of ethylene oxide employed in the amine-EO adducts therein specified ranged from 10–30 in some cases and from 15–50 in others. Actually, these are merely illustrative. It is possible to use compounds having from about 5 to about 100 units per amine group, depending upon the particular oil and water combination of interest.

*Examples of Process Employing Continuous Cycles*

From the foregoing tables, it was apparent that among the surfactants which may be employed in the inventive process, one of the most successful types is the group comprising a number of amine-ethylene oxide adducts. Of these, the products, identified as an ethylene oxide adduct (15–30 units) of a commercial product comprising a mixture of amines which principally covers the range $t$—$C_{11}H_{23}NH_2$ to $t$—$C_{14}H_{29}NH_2$ excelled all other surfactants tested in several oil-water systems when consideration was given to emulsion stability in caustic solution, efficiency (time and completeness) of breaking, and recoverability of the surfactant. One of them (the one having 15 units of ethylene oxide) was therefore selected for a series of recycling experiments in which the same batch of caustic-surfactant solution was used repeatedly to form the emulsion, then reclaimed, freed of most of the inorganic salt, and used again to emulsify a fresh batch of the same oil. The number of cycles in such experiment was limited only by the fact that the volume of emulsion was constantly being decreased as samples were removed for determination of emulsion stability in caustic solution and for analysis. This type of limitation will vary, depending upon the scale on which my invention is practiced, any samples needed during the process, etc., if no make-up surfactant is used.

The results obtained with the recycling process are set forth in Tables 5 to 8. They were obtained by the following procedure:

Equal volumes of oil and of a 0.5 percent caustic-0.5 percent surfactant solution (500 cc. of each phase at the start) were vigorously mixed by a mechanical shaker for 15 minutes. A control sample of the emulsion was withdrawn for measuring emulsion stability in caustic, allowed to stand for an hour, and the phase volumes read. The remaining emulsion was poured into a graduated separatory funnel and dilute $H_2SO_4$ added until the emulsion broke and the pH was below 5, shaking well after adding each increment. The completeness of breaking (i.e., percent recovery of oil) was determined.

A sample of the aqueous phase (and of the organic phase in the case of toluene) was withdrawn and analyzed for surfactant. An amount of $Ca(OH)_2$ equivalent to the $H_2SO_4$ present was added to the solution. The solution was shaken for a few minutes, then filtered to remove the precipitate. A sufficient amount of NaOH was then added to raise the pH to that of the starting solution, viz., 12.8–12.9.

Failure to remove $CaSO_4$ prior to replenishing caustic would result in the redissolving of some $CaSO_4$, and such removal is, therefore, preferable. (If other alkaline materials are used in lieu of the $Ca(OH)_2$, this problem need not occur. Optionally, also, HCl [or any other inorganic acid, or organic acid, or acid salts] could be used instead of $H_2SO_4$, and other alkaline materials can also be used. The HCl and NaOH will form NaCl which can be allowed to accumulate or may be removed by some other means without interfering with the process.) The $Ca(OH)_2$ precipitated by the NaOH was eliminated by refiltration. The volume of the filtrate was measured and an equal volume of fresh oil added thereto, after which all of the foregoing steps were repeated a number of times as shown in Tables 5 to 8.

The cyclic process is typically represented in the diagram shown in the attached drawing which illustrates an application of my invention to oil recovery from petroleum-bearing formations. The drawing shows, in outline fashion, a "flow diagram" of oil recovery via wells employing the process of my invention.

Tables 5 to 8 set forth data obtained when the cyclic process was applied to each of four different oils, using one of the preferred surfactants (the one having 15 units of ethylene oxide as an adduct of $$t—C_{11-14}H_{23-29}NH_2)$$

as aforesaid.

TABLE 5.—TOLUENE

| Cycle No. | Emul. instab. in control | pH after acidification | Emul. instab. after acidification | Percent of I.C.* in $H_2O$ | Cumulative Percent of I.C.* | Percent of I.C. in tol. | Cum. Percent of I.C. in tol. |
|---|---|---|---|---|---|---|---|
| 0 | 40 | 2.9 | (100) | (102.5) | (102.5) | (0.6) | (0.6) |
| 1 | 51 | 2.1 | 101 | 99.8 | 102.2 | 0 | 0.6 |
| 2 | 39 | 2.6 | 100 | 98.0 | 100.2 | 0 | 0.6 |
| 3 | 28 | 2.2 | 100 | 98.5 | 96.7 | 0.6 | 1.2 |
| 4 | 50 | 2.4 | 100 | 100.8 | 99.4 | 3.8 | 5.0 |
| 5 | 50 | 2.8 | | 97.6 | 97.0 | 0.6 | 5.7 |
| 6 | 49 | 2.7 | 101 | 101.0 | 98.0 | −0.7 | 5.0 |
| 7 | 64 | 2.2 | 102 | 100.0 | 98.0 | 2.9 | 7.8 |

* "I.C." is initial concentration.

Table 6.—VENTURA CRUDE OIL

| Cycle No. | Emul. instab. in control | pH after acidification | Percent of I.C.[a] in H₂O | Cumulative percent of I.C. |
|---|---|---|---|---|
| 0 | 52 | 3.5 | (99) | (99) |
| 1 | 0 | 2 | 90 | 90 |
| 2 | 76 | 2 | 109 | 98 |
| 3 | 4 | 2 | 82 | 80 |
| 4 | 32 | | | |

[a] "I.C." is initial concentration.

TABLE 7.—HOWARD GLASSCOCK CRUDE OIL

| Cycle No. | Emul. Instab. in in control | pH after acidification | Emul. Instab. after acidification | Percent of I.C.[a] in H₂O | Cumulative percent of I.C. |
|---|---|---|---|---|---|
| 0 | 64 | 3.0 | (96) | (96) | (96) |
| 1 | 96 | 2.8 | 100 | 99 | 95 |
| 2 | 0 | 3.4 | 80 | 99 | 94 |
| 3 | 88 | 3.0 | 91 | 100 | 94 |
| 4 | 72 | 2.8 | 94 | 90 | 85 |
| 5 | 54 | 2.7 | 94 | 93 | 79 |
| 6 | 94 | 2.3 | 100 | 93 | 74 |

[a] "I.C." is initial concentration.

TABLE 8.—HAWKINS FIELD CRUDE OIL

| Cycle No. | Emul. Instab. in in control | pH after acidification | Emul. Instab. after acidification | Percent of I.C.[a] in H₂O | Cumulative percent of I.C. |
|---|---|---|---|---|---|
| 0 | 30 | 3.1 | (93) | (89) | (89) |
| 1 | 84 | 3.1 | 95 | 89 | 79 |
| 2 | 63 | 2.5 | 97 | 90 | 71 |
| 3 | 63 | 2.3 | 89 | 89 | 63 |
| 4 | 46 | 2.5 | 87 | 91 | 57 |
| 5 | 100 | 2.7 | 99 | 98 | 56 |
| 6 | 60 | 2.7 | 82 | 90 | 50 |
| 7 | 50 | 2.4 | 88 | 94 | 47 |

[a] "I.C." is initial concentration.

Some of the more salient points reflected by the recycling data in Tables 5 to 8 may be summarized as follows:

*Average Percent Recovery of Aqueous Phase After Acidification*

Toluene _____ 100
Ventura _____ 95
Glasscock _____ 94
Hawkins _____ 91

*Percent Recovery of Organic Phase After Acidification*

Toluene _____ 100.

Ventura _____ ⎫
Glasscock _____ ⎬ In nearly all cases, the volume of black upper phase was a little greater than the volume of pure oil available. The interface was not discernible, so that the exact percentages of pure oil and water-in-oil emulsion could be determined.
Hawkins _____ ⎭

*Average Percent Recovery of Surfactant into Aqueous Phase*

Toluene _____ 100
Ventura _____ 94
Glasscock _____ 94
Hawkins _____ 91

*Conclusions and Observations*

The foregoing description has clearly demonstrated the efficient manner in which my invention can be employed in connection with the recovery of oil by such common practices as the drilling of adjacent holes deep into the ground, then injecting a flushing material into one hole to force the oil out of another. In the past, water containing a surfactant was used for this flushing operation. Then a more recent development involved the use of a mixture of a surfactant such as t-octylphenol ethylene oxide adduct and a caustic solution. This flushing procedure emulsified oils which were contained in petroleum-producing formations, and the like, which could not be broken loose and flushed out by pre-existing procedures. A detailed explanation of this procedure can be found in U.S. Patent 2,882,973.

The major obstacles to widespread use of this last procedure have been the difficulty and expense involved in breaking the emulsion thus formed, plus the fact that the surfactant has not been recoverable. My invention has overcome this objection and now makes it possible to employ this efficient and economical technique for the recovery of many billions of gallons of oil which heretofore were relatively inaccessible from a commercial standpoint.

I claim:

1. The process of recovering oil from an oil-bearing formation which comprises introducing thereunto through an injection well an alkaline aqueous solution of a pH-sensitive surfactant so as to form an oil-water emulsion in the well, the surfactant being selected from the class consisting of
    (a) the ethylene oxide adducts of a range of amines represented by the formula $C_{11-24}H_{23-49}NH_2$ where the number of ethylene oxide units is from 5 to 50 per amine;
    (b) $C_{11-24}H_{23-49}NH(C_2H_4O)_nSO_4Na$ where $n=3$ to 50; and
    (c)

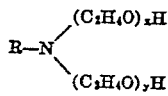

in which R is a dehydroabietyl group and $x+y=15$ to 50, collecting the oil-water emulsion which issues from said well, and adding to the emulsion an acidic substance so as to make the oil-water system acidic and thereby concentrate the surfactant in a bulk phase where it is available for further use, while concentrating the oil in another phase.

2. The process of recovering oil from an oil-bearing formation which comprises introducing thereunto through an injection well an acidic aqueous solution of a pH-sensitive surfactant so as to form an oil-water emulsion in the well, the surfactant being selected from the class consisting of
    (a) the ethylene oxide adducts of a range of amines represented by the formula $C_{11-24}H_{23-49}NH_2$ where the number of ethylene oxide units is from 5 to 50 per amine;
    (b) $C_{11-24}H_{23-49}NH(C_2H_4O)_nSO_4Na$ where $n=3$ to 50; and
    (c)

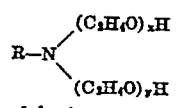

in which R is a dehydroabietyl group and $x+y=15$ to 50, collecting the oil-water emulsion which issues from said well, and adding to the emulsion an alkaline substance so as to make the oil-water system alkaline and thereby concentrate the surfactant in a bulk phase where it is available for further use, while concentrating the oil in another phase.

References Cited in the file of this patent

UNITED STATES PATENTS

| | | |
|---|---|---|
| 2,288,857 | Subkow | July 7, 1942 |
| 2,662,062 | Sumerford | Dec. 8, 1953 |
| 2,882,973 | Doscher | Apr. 21, 1959 |

OTHER REFERENCES

"The Chemistry of Fatty Amines," published by Armour & Co., 1948, pp. 1–5, 17, and 18.